(12) United States Patent
Rathnakar

(10) Patent No.: US 6,186,900 B1
(45) Date of Patent: Feb. 13, 2001

(54) FLEXIBLE SHAFT

(76) Inventor: Yadama Rathnakar, 1685 Beechwood Ave., San Leandro, CA (US) 94579

( * ) Notice: Under 35 U.S.C. 154(b), the term of this patent shall be extended for 0 days.

(21) Appl. No.: 09/341,553

(22) PCT Filed: Jan. 16, 1998

(86) PCT No.: PCT/US98/00768
§ 371 Date: Jul. 14, 1999
§ 102(e) Date: Jul. 14, 1999

(87) PCT Pub. No.: WO98/31944
PCT Pub. Date: Jul. 23, 1998

(51) Int. Cl.$^7$ ............................................. F16C 1/00
(52) U.S. Cl. ............................ 464/148; 464/52; 59/78
(58) Field of Search .......................... 464/52, 148, 147, 464/173, 179, 185, 101, 106; 59/3, 78, 72

(56) References Cited

U.S. PATENT DOCUMENTS

| | | |
|---|---|---|
| 401,681 | 4/1889 | Brown . |
| 501,731 * | 7/1873 | Priest ................................ 464/148 |
| 595,708 | 12/1897 | Forsyth . |
| 1,102,947 * | 7/1914 | Nissen ............................... 464/148 |
| 1,245,229 * | 11/1917 | Heath ................................ 464/148 |
| 1,415,689 | 5/1922 | Parent . |
| 1,550,683 | 8/1925 | Erikson . |
| 1,595,922 * | 8/1926 | Prindle ............................. 464/148 |
| 2,030,511 * | 2/1936 | Gruber ............................... 464/52 |
| 2,153,433 | 4/1939 | Schaefer . |
| 2,421,789 | 6/1947 | Ingham . |
| 3,267,203 | 8/1966 | Rosenberg . |
| 3,304,878 | 2/1967 | Sabre . |
| 3,983,692 * | 10/1976 | Perl ..................................... 59/82 |
| 4,291,212 | 9/1981 | Bui . |
| 4,362,520 * | 12/1982 | Perry ................................. 464/149 |
| 4,432,874 | 2/1984 | Lundin . |
| 5,554,073 | 9/1996 | Yadama . |

FOREIGN PATENT DOCUMENTS

| | | |
|---|---|---|
| 0357438A2 | 7/1990 | (EP) . |
| 0357438A3 | 7/1990 | (EP) . |
| 541929 | 8/1922 | (FR) . |
| 547862 | 9/1942 | (GB) . |
| 861600 | 7/1957 | (GB) . |

* cited by examiner

Primary Examiner—Lynne H. Browne
Assistant Examiner—Kenneth Thompson
(74) Attorney, Agent, or Firm—Burns, Doane, Swecker & Mathis, L.L.P.

(57) ABSTRACT

A flexible shaft comprising a flexible outer tube (10) containing a shaft core with specially designed links (18) that closely fit within the smooth interior of the outer tube (10). The links (18) are substantially rectangular and have construction which limits a flex angle between links. The links (18) may include stop surfaces (17) which limits the flex angle to prevent kinking or limit longitudinal movement of the links (18) with respect to one another.

16 Claims, 3 Drawing Sheets

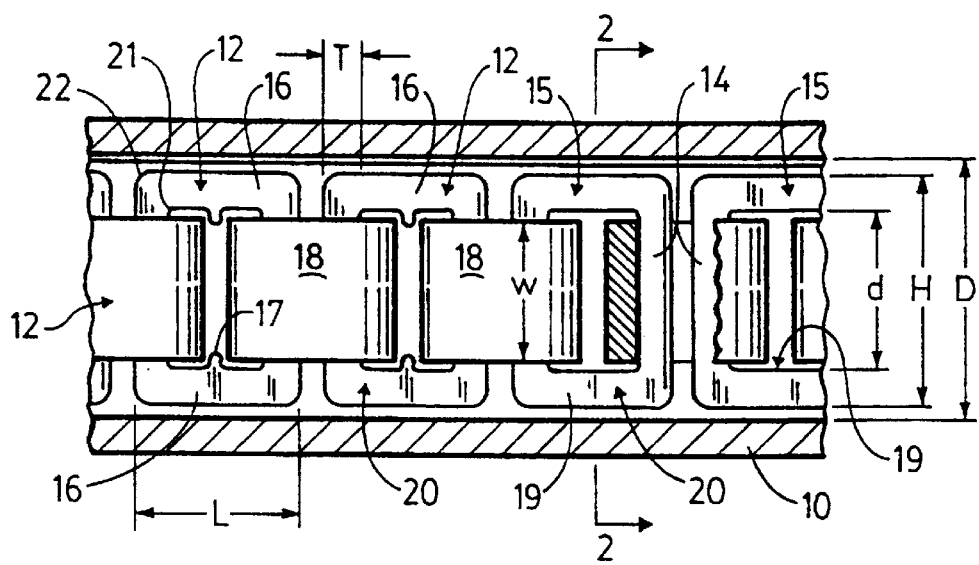
FIG._1.
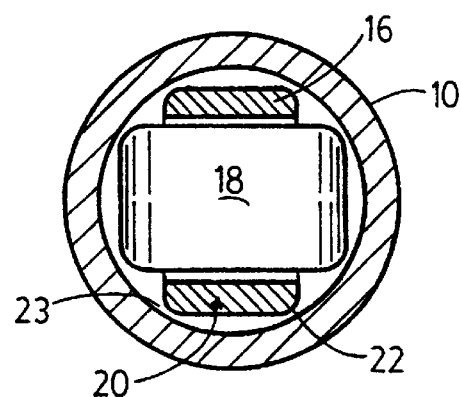
FIG._2.
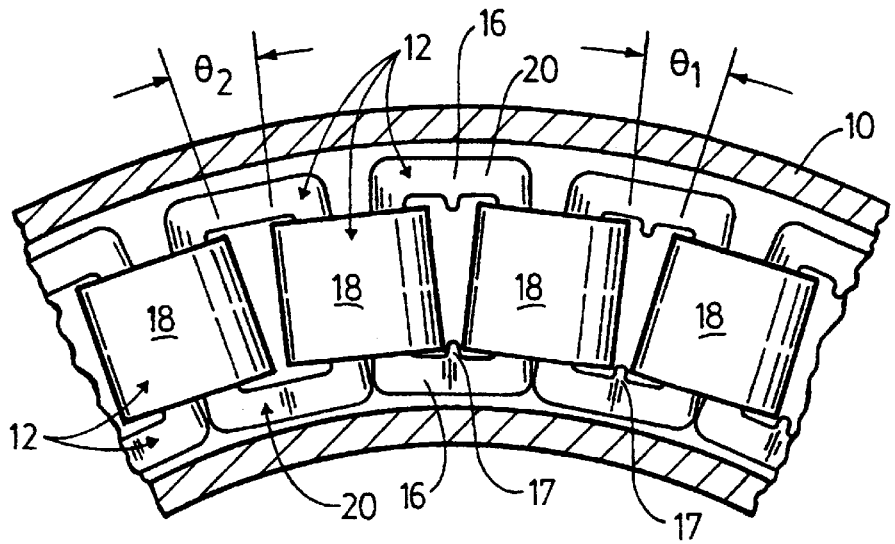
FIG._3.

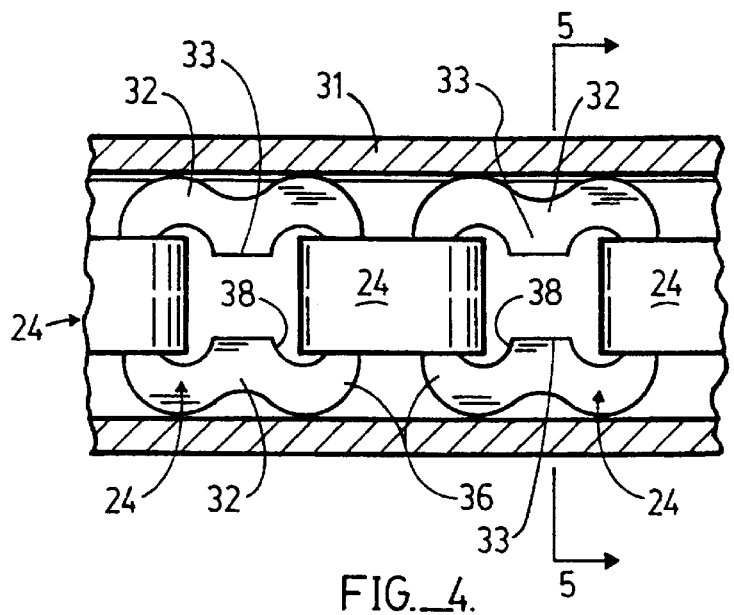
FIG._4.
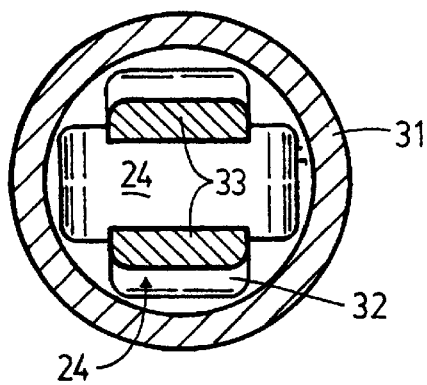
FIG._5.
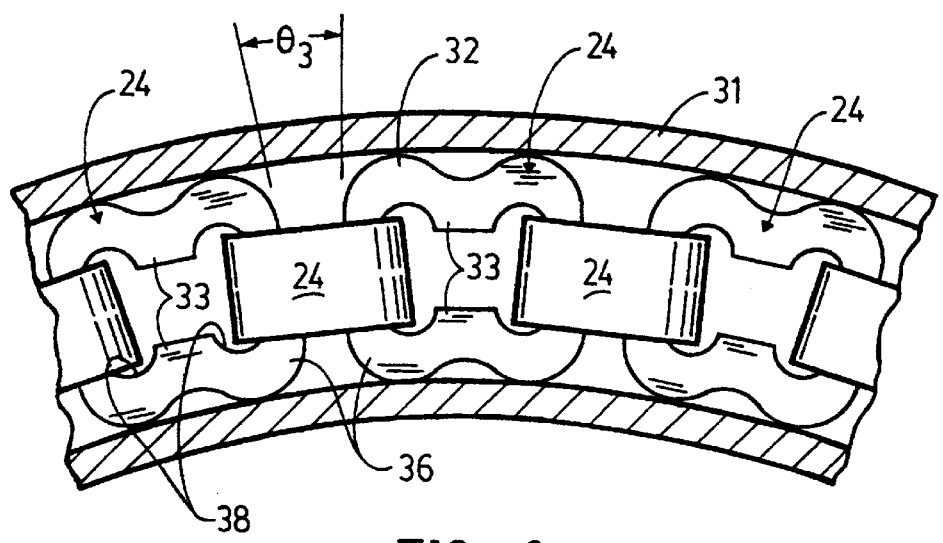
FIG._6.

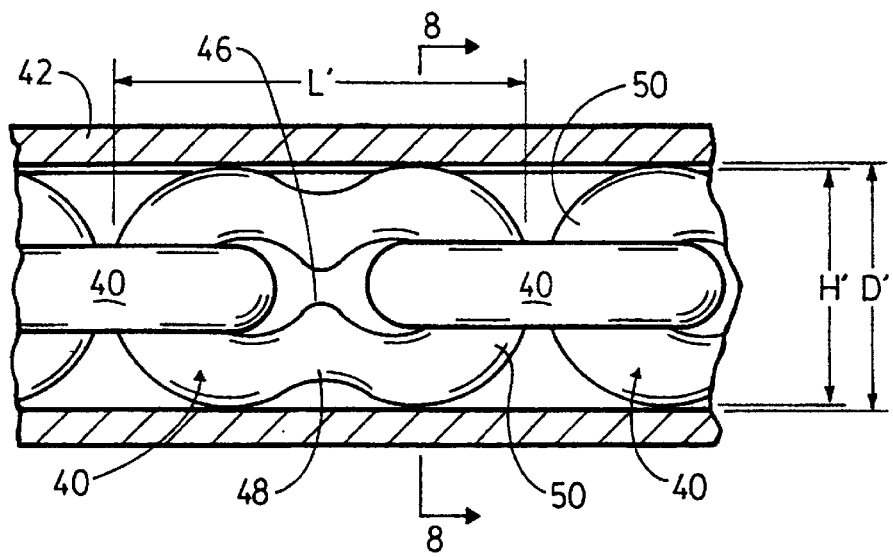
FIG._7.
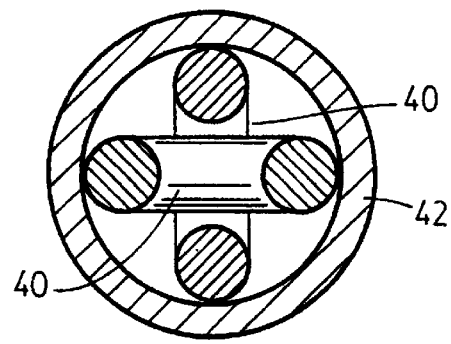
FIG._8.
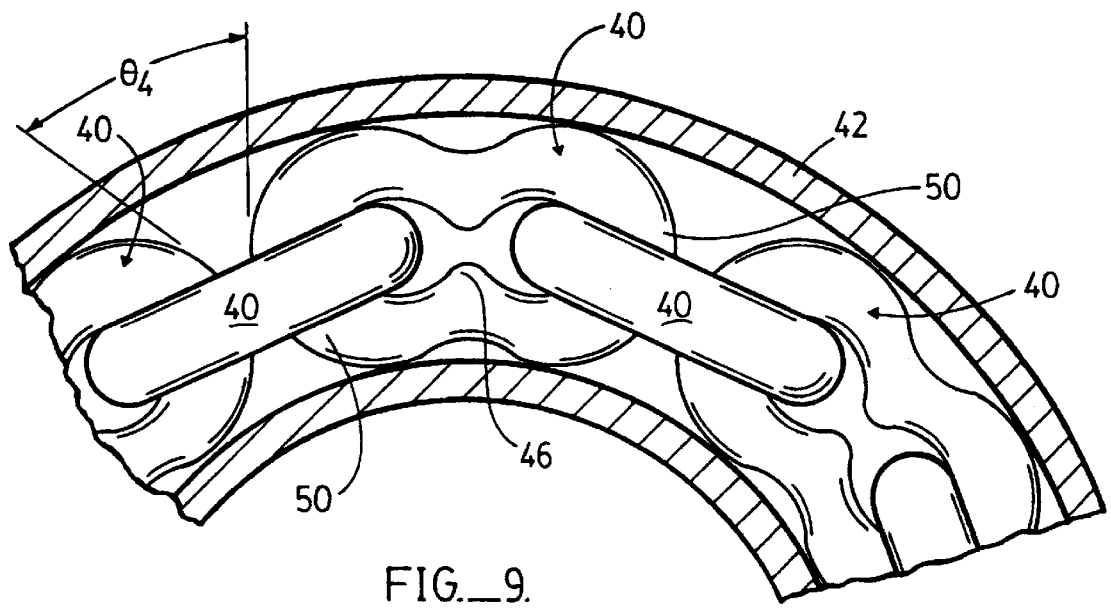
FIG._9.

FLEXIBLE SHAFT

BACKGROUND OF THE INVENTION

The invention relates to rotatable flexible shafts and particularly to a flexible shaft capable of driving high torque loads with the shaft at unusual angles and with minimum backlash.

Conventional flexible shafts comprise an outer casing of flexible material and an inner rotational power transmission shaft formed by either (1) wrapped successive layers of wire around a central core wire or by (2) a conventional chain. In the first mentioned shaft, the successive layers of wire are wound in opposite directions with the outermost layer determining the direction of rotation in which the shaft is designed to rotate. If rotated in the opposite direction, the outer layer and the alternate under layers tend to unwind and become loosened, resulting in a reduced torque handling capability of the shaft. Conversely, as the shaft is rotated in the direction for which it was designed, the layers tend to become tight, increasing the torque handling capability but reducing the flexibility In the second mentioned shaft, chain cores made of conventional links have medium torque handling capability with low flexibility provided the chain is kept under tension. If the chain tension is not maintained and becomes only slightly loose in the tubular shell of the casing, it will kink and form knots. Continued rotation of a knotted chain will soon tear apart the casing.

U.S. Pat. No. 5,554,073, overcomes the problem of chain knotting within the tubular shell by forming each link of the chain with two attached loops at a right angle to each other and each having a diameter that fits within the bore of the outer cashing. Each loop in the link therefore holds the other loop along the diameter of the shell and prevents misalignment and resulting knotting if the chain becomes loose.

Torque load capability of any drive shaft is a function of its material strength and its construction. A shaft made of copper or a readily frangible material will not have as long a life as a shaft made of strong steel.

Backlash, or the lost rotation between entry and exit of a shaft being reversed, is a problem in flexible shafts having chain cores when reversing is required because there is a considerable amount of backlash between each successive pair of links in the chain.

It has been found that a shaft having a single link construction with specially designed links will perform as well as the two loop chain described in U.S. Pat. No. 5,554.073 if the links are prevented from tumbling, that is, remain erect along the diameter of the tubular outer shell so that the links cannot tip forward or backward along the axis of the tubing.

The flexible shaft of the invention includes a flexible tubular outer casing containing a flexible shaft formed of a plurality of interconnected links of a design that prevents tumbling and knot-forming and permits unusually high torque loads with less than the usual amount of backlash. This design eliminates the right-angled connection of the two loop link of the above-mentioned patent and facilitates ease of manufacture of various sized links but also results in a stronger, simpler, more durable low cost product. It is contemplated that the flexible shafts to be described shall be constructed of steel or some equally strong composite for heavy duty, high torque loads.

BRIEF DESCRIPTION OF THE DRAWINGS

In the drawings which illustrate preferred embodiments of the invention:

FIG. 1 is a partial cross-sectional view of a high torque capability flexible shaft according to a first embodiment of the invention;

FIG. 2 is a cross-sectional view of the shaft of FIG. 1 taken along line 2—2;

FIG. 3 is a partial cross-sectional view of the shaft embodiment of FIG. 1 in a flexed position;

FIG. 4 is a partial cross-sectional view of a second embodiment of a fairly high torque capability flexible shaft;

FIG. 5 is a cross-sectional view of the shaft of FIG. 4 taken along the line 5—5;

FIG. 6 is a partial cross-sectional view of the shaft embodiment of FIG. 4 in a flexed position:

FIG. 7 is a partial cross-sectional view of yet another embodiment of a flexible shaft having moderate torque capability but high flexibility;

FIG. 8 is a cross-sectional view of the embodiment of FIG. 7 taken along the line 8—8; and FIG. 9 is a partial cross-sectional view of the shaft embodiment of FIG. 7 with the shaft in a flexed position.

DETAILED DESCRIPTION OF THE PREFERRED EMBODIMENT

One of the principal advantages of the flexible shaft of the invention is that the shaft core is formed of links that are designed to remain erect and will riot tumble and cause knotting of the links if tension is reduced on the core. The flexible shaft of the present invention also decreases backlash due to the link shape which reduces clearance between links.

FIG. 1 is a partial cross-sectional side view of a flexible shaft capable of transmitting a high torque with good flexibility. The shaft of FIG. 1 includes an outer flexible tubular casing 10 having a smooth interior surface and a constant interior diameter. The casing 10 contains and surrounds a plurality of interconnected links 12 forming the shaft core. As illustrated, each of the links 12 is preferably identical and each is formed of two parallel vertical legs 14 extending across the casing 10 and two parallel horizontal legs 16 which extend along the length of the casing and lie very close to the interior wall of the casing. The vertical legs 14 and the horizontal legs 16 are substantially planar and are connected to each other to form a link having a rectangular shape with a substantially rectangular central opening. Each of the links 12 have a wall thickness T and a link width W. The links 12 are relatively thick and the width W is greater than the thickness T. Preferably the width W is at least 3 times the thickness T of the links. The links 12 also have a length L and a height H. Preferably, the length L is less than 1⅓ the height H of the links.

The link width W is just slightly less than an interior dimension d of the links. This allows the shaft to flex while minimizing the amount of backlash occurring when the direction of rotation of the shaft is reversed due to minimal play between the links.

The height H of the links is slightly less than the inside diameter D of the casing 10. Accordingly, the horizontal legs 16 are parallel with the inside wall of the casing and, as shown in the end view of FIG. 2, are located very close to the smooth inside wall of the casing 10. The links 12 are thus prevented from tumbling.

Two of the links 12 of FIG. 1 are shown with a depressed center section 17 in the form of an inwardly protruding ridge on the horizontal legs 16 which functions as a stop for the links, and also as a convenient location to weld together two opposite sides of each link during manufacturing. These depressed center sections 17 are not essential to the operation and, therefore, two of the links 15 on the right of FIG. 1 are shown with a straight horizontal legs 19. The stops 17 will effect the amount of flex in the shaft.

The links 18 of FIG. 1 having a first orientation are preferably interconnected with identical links 20 having an orientation at 90 degrees to the first orientation as shown in the end view of FIG. 2. Each of the links 18 and 20 in FIG. 2 is shown with smooth rounded outer edges 22 which protect the inside surface of the casing 10 from being cut or worn by sharp corners and also permit the links to fit closer to the casing to further prevent tumbling. However, the links should not form an interference fit against the inside surface of the casing 10, and a space 23 between the links and the casing provides flexibility to the shaft. The links 18 and 20 also have rounded inner corners 21 providing for smooth flexing operation of the shaft. The rounded inner corners 21 reduce friction between the links for a smooth vibration free running.

FIG. 3 illustrates the shaft of FIG. 1 in a flexed configuration. As shown in FIG. 3, a flex angle $\theta_1$ or $\theta_2$ is identified as an angle between adjacent legs of two horizontal links 18 or between adjacent legs 14 of two vertical links 20. In the right side of FIG. 3, the flex angle $\theta_1$ is limited by the stop surfaces 17 of the links. Where no stop is present as in the left portion of FIG. 3, the maximum flex angle $\theta_2$ is achieved when the lower corners of two adjacent horizontal links 18 touch. The maximum flex angles depend on the dimensions of the links. In particular, the flex angle can be increased by increasing the length L of th links, or by decreasing the thickness T of the link walls. However, as the length L is increased beyond a certain value. knotting of the shaft core may occur. For example, if the length L is increased until the maximum flex angle $\theta_1$ or $\theta_2$ is close to 180° knotting of the shaft core can occur. The maximum flex angle $\theta_1$ or $\theta_2$ according to the present invention is 45 degrees or less, preferably 25 degrees or less. A trade off occurs between the flex angle and the amount of torque handling ability of the shaft, for example, for flex angles greater than 45 degrees the torque handling ability of the shaft is greatly reduced.

The maximum flex angle $\theta_1$ or $\theta_2$ can also be increased by reducing the thickness T of the links. However, a reduced thickness T also reduces the bearing surface of the links and thus, increases the wear and tear and decreases the shaft life. The parameters L, T, and W for a given shaft diameter can be optimized to achieve a desired flex angle.

The torque handling capability of the flexible shaft is directly proportional to the width W of the links, Accordingly, from a torque transmission standpoint the links should have a large width W and large thickness T. To maximize the width W, the cross-sectional area covered by the vertical legs 14 should be maximized, for a given inner diameter of the casing 10.

The torque handling capacity of the shaft of the present invention varies according to the shaft diameter with larger shaft diameters providing large torque transmission. A shaft having a casing inner diameter of 8 inches can transmit about 12,550 ft lbs with the shaft in a straight configuration. The horsepower transmitted by such a shaft is about 4,750 hp at 2,000 rpm. As the shaft is bent, the amount of torque transmitted by a given diameter shaft is reduced slightly by frictional losses. In the present invention, these frictional losses for a shaft bent 180 degrees are generally less than 15 percent depending on the link design and type of lubrication.

Other examples of flexible shaft torque transmissions for a particular diameter shaft include a shaft having a casing inner diameter of 4 inches with a torque transmission capability of about 1,570 ft lbs which is capable of transmitting about 600 hp at 2,000 rpm; and a casing inner diameter of 1 inch with a torque transmission capability of 25 ft lbs which is capable of transmitting about 9 hp at 2,000 rpm. Although the foregoing examples describe shafts having inner casing diameters up to 8 inches, it should be understood that where higher torque transmission is required, shafts may be formed with larger diameters such as 12 inches and even greater. The calculations have been made for a shaft core formed of stainless steel and a link width W which is approximately ½ the inner diameter D of the casing, however, other materials and configurations are also possible.

FIGS. 4–6 show a flexible shaft formed of a plurality of identical links or substantially identical links 24 surrounded by a casing 31. The links 24 are similar in shape and function to the links of the embodiment of FIGS. 1–3. The links 24 according to the embodiment of FIGS. 4–6 include a first set of two parallel legs 32 and a second set of two parallel legs 36. The first two parallel legs 32 each include a depressed central section 33 providing a stop surface which prevents flexing of the shaft past a predetermined maximum flex angle. The dimensions of the links 24. according to the embodiment of FIGS. 4–6 can be determined in accordance with the principals described above with respect to FIGS. 1–3. As shown in FIG. 6, the maximum flex angle $\theta_3$ is limited by the stop surfaces 33 when one of the second legs 36 comes into contact with a curved interior surface 38 of the protruding central member 33.

FIGS. 7–9 illustrate an alternative embodiment of a very flexible, high torque handling flexible shaft. According to this embodiment, the shaft is formed of a plurality of substantially identical links 40. The links 40 are made of relatively heavy round bar having a diameter between ¼ and ½, preferably slightly less than ⅓ of an inside diameter of the tubular casing 42. The round bar is formed into a link having a total Height H' that is slightly less than the casing inside diameter D', and a length L' between 1 and 1¾, preferably approximately 1⅓ the height H'. Although the length L' of the links 40 could be greater, the flexibility of the shaft would be reduced accordingly.

Each of the link 40 is coupled to identical adjacent links and have a central confining bend 46 in a horizontal leg 48 for restricting the longitudinal movement of the adjacent links within the central openings of the link. Forming the confining bend 46 in the link provides a reduced link diameter at a position near the center of the horizontal leg for restricting the movement of the adjacent links and also facilitates in the welding together of the links by providing a welding surface that does not contact the interior side wall of the casing 42 and therefore does not require a polished surface.

A maximum flex angle $\theta_4$ of the embodiment of FIGS. 7–9 is not limited by the bend 46 because the links 40 have rounded vertical legs 50 which mate with corresponding openings in adjacent links. The mating configuration of the links 40 keeps the links aligned with and centered in the casing 42.

Compared to conventional flexible chain drives shafts, the present invention achieves lower frictional losses due to the rounded interior corners of the links.

The flexible shaft according to the embodiments described above is useful in transferring almost unlimited torque at high flex angles. The torque delivered by the flexible shaft can be increased by proportionally increasing the shaft diameter. The shaft may be formed of either metallic or composite materials and allows a 180 degree direction change with minimal friction loss. The high flexibility of the present invention allows a wide range of applications from consumer products such as power tools to space applications such as space rovers. Examples of applications include vehicle drive shafts, automobile power seat drives, and surgical and medical instruments. The new design is simpler, stronger, and less expensive to manufacture than known shafts and can be designed to achieve high flex angles while delivering high torque.

While the invention has been described in detail with reference to the preferred embodiments thereof, it will be apparent to one skilled in the art that various changes and modifications can be made and equivalents employed without departing from the present invention.

What is claimed is:

1. A flexible torque transmitting shaft comprising:
   a tubular flexible casing;
   a shaft core positioned within the flexible casing and including a plurality of horizontal links and a plurality of vertical links generally perpendicular to and interconnecting the horizontal links to form the shaft core, each of the horizontal and vertical links including first and second spaced parallel legs, and third and fourth spaced parallel legs connecting the first and second legs to form a substantially rectangular link, wherein a flex angle of the shaft is defined by an angle between the first and second legs of two adjacent horizontal links or two adjacent vertical links, and the flex angle is limited by the configuration of the horizontal and vertical links.

2. The flexible torque transmitting shaft according to claim 1, wherein the flex angle has a maximum value of 45 degrees.

3. The flexible torque transmitting shaft according to claim 1, wherein the flex angle is limited by a plurality of stop surfaces provided on interior surfaces of the third and fourth legs of the vertical and horizontal links.

4. The flexible torque transmitting shaft according to claim 1, wherein the horizontal and vertical links have lengths less than $1\frac{1}{3}$ of a height of the links in a direction perpendicular to the length.

5. The flexible torque transmitting shaft according to claim 1, wherein the first and second parallel legs of the horizontal and vertical links are substantially planar.

6. The flexible torque transmitting shaft according to claim 5, wherein the third and fourth parallel legs of the horizontal and vertical links are substantially planar.

7. The flexible torque transmitting shaft according to claim 6, wherein corners of the first, second, third, and fourth links are rounded at an exterior of the link to prevent damage to the casing.

8. The flexible torque transmitting shaft according to claim 6, wherein corners of the first, second, third, and fourth links are rounded at an interior of the link to reduce frictional losses.

9. The flexible torque transmitting shaft according to claim 1, wherein a width of each of the legs is greater than a thickness of the legs.

10. A flexible torque transmitting shaft comprising:
    a tubular casing flexible along a longitudinal axis; and
    a shaft core inside the flexible tubular casing for transmitting torque, the shaft core including a plurality of links, each of the links comprising:
    two end portions having a width arranged substantially perpendicular to the longitudinal axis of the casing; and
    a single opening extending through the link in a direction parallel to the width for receiving the end portions of two adjacent links, the opening having a dimension across the opening about midway between the two end portions of adjacent links, wherein the dimension across the opening is less than the width of the end portions of the adjacent links to prevent kinking of the shaft core.

11. The flexible torque transmitting shaft according to claim 10, wherein the reduced dimension across the opening provides a stop surface which limits a flex angle to a maximum value of 45 degrees.

12. The flexible torque transmitting shaft according to claim 10, wherein the links have lengths less than $1\frac{1}{3}$ of a height of the links in a direction perpendicular to the longitudinal axis of the casing.

13. The flexible torque transmitting shaft according to claim 10, wherein the links are formed of first and second parallel legs and third and fourth parallel legs connected to form a continuous link.

14. The flexible torque transmitting shaft according to claim 13, wherein the first, second, third, and fourth parallel legs of the horizontal and vertical links are substantially planar.

15. The flexible torque transmitting shaft according to claim 14, wherein corners of the first, second, third, and fourth links are rounded at an exterior of the link to prevent damage to the casing.

16. The flexible torque transmitting shaft according to claim 14, wherein corners of the first, second, third, and fourth links are rounded at an interior of the link to reduce frictional losses.

* * * * *